United States Patent
McCall et al.

(10) Patent No.: US 9,004,992 B2
(45) Date of Patent: Apr. 14, 2015

(54) APPARATUS TO MONITOR A PARKED VEHICLE AT A CONVENIENCE STATION

(75) Inventors: Adam McCall, Greenback, TN (US); Jesse Merritt, Jefferson City, TN (US); Daniel Zelenak, Lebanon, TN (US)

(73) Assignee: Convoy Solutions LLC, New York, NY (US)

( * ) Notice: Subject to any disclaimer, the term of this patent is extended or adjusted under 35 U.S.C. 154(b) by 1814 days.

(21) Appl. No.: 12/249,422

(22) Filed: Oct. 10, 2008

(65) Prior Publication Data

US 2010/0093268 A1  Apr. 15, 2010

(51) Int. Cl.
*B60H 1/00* (2006.01)

(52) U.S. Cl.
CPC .................................. *B60H 1/00257* (2013.01)

(58) Field of Classification Search
USPC .......................................................... 454/119
See application file for complete search history.

(56) References Cited

U.S. PATENT DOCUMENTS

| | | | | |
|---|---|---|---|---|
| 2,612,830 A | * | 10/1952 | Kendrick ...................... | 454/119 |
| 2,646,496 A | * | 7/1953 | Takach .......................... | 392/347 |
| 2,683,407 A | * | 7/1954 | Takach .......................... | 454/119 |
| 2,962,951 A | * | 12/1960 | Holmes ......................... | 454/119 |
| 3,360,954 A | * | 1/1968 | Snider et al. .................. | 62/259.1 |
| 3,777,506 A | * | 12/1973 | Hergatt et al. ................. | 62/237 |
| 4,632,019 A | * | 12/1986 | Whiteman ...................... | 454/76 |
| 5,386,461 A | * | 1/1995 | Gedney .................... | 379/102.05 |
| 5,687,573 A | * | 11/1997 | Shih ............................... | 62/3.6 |
| 5,717,398 A | * | 2/1998 | Pollin ............................ | 342/20 |
| 5,792,948 A | * | 8/1998 | Aoki et al. ................. | 73/115.01 |
| 5,931,012 A | * | 8/1999 | Robertson ...................... | 62/237 |
| 5,970,436 A | * | 10/1999 | Berg et al. ..................... | 702/177 |
| 6,127,939 A | * | 10/2000 | Lesesky et al. ............... | 340/438 |
| 6,386,527 B2 | * | 5/2002 | Oberle ..................... | 267/140.14 |
| 6,482,080 B2 | * | 11/2002 | Wilson et al. ................. | 454/119 |
| 6,640,644 B1 | * | 11/2003 | Mireles et al. .................. | 73/721 |
| 6,705,938 B2 | * | 3/2004 | Everhart et al. ............... | 454/119 |
| 6,981,544 B2 | * | 1/2006 | Iwanami et al. .............. | 165/202 |
| 7,753,765 B2 | * | 7/2010 | Wilson et al. ................. | 454/119 |
| 7,811,159 B2 | * | 10/2010 | Wilson et al. ................. | 454/119 |
| 2001/0031618 A1 | * | 10/2001 | Wilson et al. ................. | 454/119 |
| 2003/0036346 A1 | * | 2/2003 | Wilson et al. ................. | 454/119 |
| 2003/0061825 A1 | | 4/2003 | Sullivan | |
| 2003/0182042 A1 | | 9/2003 | Watson et al. | |
| 2005/0113014 A1 | * | 5/2005 | Everhart et al. ............... | 454/119 |
| 2006/0154591 A1 | * | 7/2006 | Everhart et al. ............... | 454/119 |

(Continued)

OTHER PUBLICATIONS

Texas Transportation Institute, Heavy-Duty Diesel Vehicle (HDDV) Idling Activity and Emissions; Study: Phase 1—Study Design and Estimation of Magnitude of the Problem. Texas Transportation Institute; The Texas A&M University System; College Station, Texas Aug. 2003.*

(Continued)

*Primary Examiner* — Steven B McAllister
*Assistant Examiner* — Jonathan Cotov
(74) *Attorney, Agent, or Firm* — Wood, Herron & Evans, LLP

(57) ABSTRACT

A service unit for providing a convenience service to a cab of a tractor trailer includes a supply panel which is operable to attach to a cab of a tractor trailer. The supply panel provides conditioned air to the cab. A vibration detection unit is configured to interact with the supply panel and detect an idling engine by detecting a vibration with a vibration detector, transmitting the vibration as vibration signals to a controller, performing a signal analysis on the vibration signals to identify an engine idle signature, and storing a duration of the engine idle signature.

13 Claims, 5 Drawing Sheets

(56) References Cited

U.S. PATENT DOCUMENTS

2006/0250281 A1* 11/2006 Mahoney et al. ............. 340/988
2007/0150295 A1* 6/2007 Dawson et al. .................. 705/1
2007/0191181 A1 8/2007 Burns

OTHER PUBLICATIONS

Shanahan, CabAire Automated Truck Plaza Parking Systems, Jun. 2007.*

Shanahan, Automated Truck Plaza Parking systems, Jun. 14, 2007, CabAire, LLC. Retrieved from Internet: URL<http://www.wilmapco.org/aq/files/2007/Other/CabAire_Shanahan_6.14.07.pdf>, pp. 1-13.

International Search Report and Written Opinion of the International Searching Authority, mailed Oct. 15, 2009, International Application No. PCT/US2009/054003, filed Aug. 17, 2009, Applicant: Idleaire, Inc.

* cited by examiner

APPARATUS TO MONITOR A PARKED VEHICLE AT A CONVENIENCE STATION

FIELD OF THE INVENTION

This invention relates to an apparatus for providing convenience services to a stationary vehicle allowing the vehicle to conserve fuel and reduce noise and particulate matter emissions by shutting off the engine. Specifically, the invention relates to a system which provides services such as heating, cooling, electrical, telephone, television, and Internet to a stationary vehicle independent of the vehicle's electrical system while monitoring for an idling engine.

BACKGROUND OF THE INVENTION

Long haul truckers frequently spend the night in the cabs of their trucks. In fact, many trucks are designed with sleeping areas. This necessitates environmental control and specifically heating and cooling. In order to provide this heating or cooling, the truck drivers generally leave the trucks running overnight to utilize the truck's heating or air conditioning system. The cumulative pollution created by these vehicles running overnight is very significant.

Further, although such trucks are in a position to receive radio signals, they are frequently located in positions where television signals are unavailable or weak and certainly no telephone connections are available to the truck itself.

Providing these services to a parked truck involves overcoming many practical and physical problems. Payment for these services is a concern as well as physically fitting the equipment needed to provide these services in a small space is problematic. Protecting this equipment from the environment is also a concern.

Apparatuses, such as those produced by IdleAire Technologies Corporation of Knoxville, Tenn., provide convenience services to a stationary vehicle independent of the vehicle electrical system. The apparatuses have an interface that couples to a vehicle to provide a substantially airtight fit allowing for a climate controlled environment. An example of such an apparatus can be seen in U.S. Pat. No. 6,482,080 entitled "Apparatus for Providing Convenience Services to Stationary Vehicles" to Wilson et al., filed on Apr. 19, 2001, and U.S. Pat. No. 6,705,938 entitled "Apparatus for Controlling the Environment of a Parked Vehicle" to Everhart et al., filed on Sep. 11, 2002, the disclosures of which are herein incorporated by reference in their entirety.

However, even with these convenience services available, drivers sometimes continue to idle their engines while using the services. For example the drivers may believe their battery is not working well enough to restart an engine, or may forget to turn off his engine, or may desire more HVAC in extreme conditions.

Truck fleets report that they are concerned with cost control. Idling during DOT mandated HOS (Hours of Service) rule periods is very costly, approaching 4%-6% of a fleet's revenues. Using the convenience services above in addition to the idling is even more costly.

Therefore there is a need in the art to provide the convenience services to stationary vehicles while simultaneously determining if the vehicle's engine is idling in order to instruct drivers and inform fleets.

SUMMARY OF THE INVENTION

A service unit for providing a convenience service such as HVAC to a cab of a tractor trailer includes a vibration detection unit. The vibration detection unit is configured to detect vibration from an idling engine of the tractor trailer and is operable to interact with the service unit.

The vibration detection unit may include a vibration detector and a controller in electrical communication with the vibration detector. The controller is operable to receive vibration data from the vibration detector. The controller may also be in electrical communication with the supply panel. The supply panel may include a display. The controller is operable to send a message to the display to alert a driver. The vibration detector and the controller may communicate using an RS232 protocol. Some embodiments of the vibration detector may utilize MEMS accelerometers.

The service unit may detect an idling engine of a cab of a tractor trailer by detecting a vibration with the vibration detector, transmitting the vibration as vibration signals to the controller, performing a signal analysis by the controller on the vibration signals to identify an engine idle signature, and in response to identifying an engine idle signature, storing a duration of the engine idle signature. A report of the stored engine idle signature duration may also be generated.

A signal analysis may be performed by the controller on the vibration signals to additionally identify a motor signature, and in response to identifying a motor signature, provide additional convenience services from the service unit. The motor signature may be from an auxiliary power unit (APU) or a transport refrigeration unit (TRU). When identified, one or more of the additional convenience services such as data reporting, TRU shore power, and identification of APU operation, may be provided.

In some embodiments, when the engine idle signature is identified, the engine idle signature is reported to an operator of the cab of the tractor trailer. In other embodiments, the engine idle signature is reported to a customer service representative. In still other embodiments, when the engine idle signature is identified, a convenience service available from a service unit is discontinued in response to identifying an extended duration of the engine idle signature.

Vibration may also be detected by measuring static and dynamic accelerations with an accelerometer. A signal analysis may be performed by the controller by monitoring a frequency component of the measured accelerations, monitoring a magnitude component of the measured accelerations, and comparing the monitored frequency and magnitude components to an empirical engine idle signature model.

An algorithm is provided for determining an idle signature. Acceleration data is received representing vibrations. The acceleration data is monitored for an established time period and in response to a magnitude of the acceleration exceeding an idle limit for the established time period, an idling status is indicated. In some embodiments of the method, angle data is also received representing a position of a service module. The angle data is monitored to detect a change in position of the service module and in response to an angle being less than about 25°, indicating a status that the service module is coupled to a vehicle, The acceleration data can be filtered through a digital low pass filter prior to monitoring the acceleration data. The acceleration data additionally can be filtered through a moving average filter prior to monitoring the acceleration data. The established time period may be approximately 30 consecutive seconds and the idle limit approximately 0.035 g.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

An apparatus for providing convenience services to stationary vehicles independent of the vehicle electrical system is disclosed. The illustrated embodiment shows the apparatus, or services module, providing services to over-the-road trucks. Those skilled in the art will recognize that vehicles other than trucks may utilize the services module without departing from the spirit and scope of the present invention.

Figure 1:
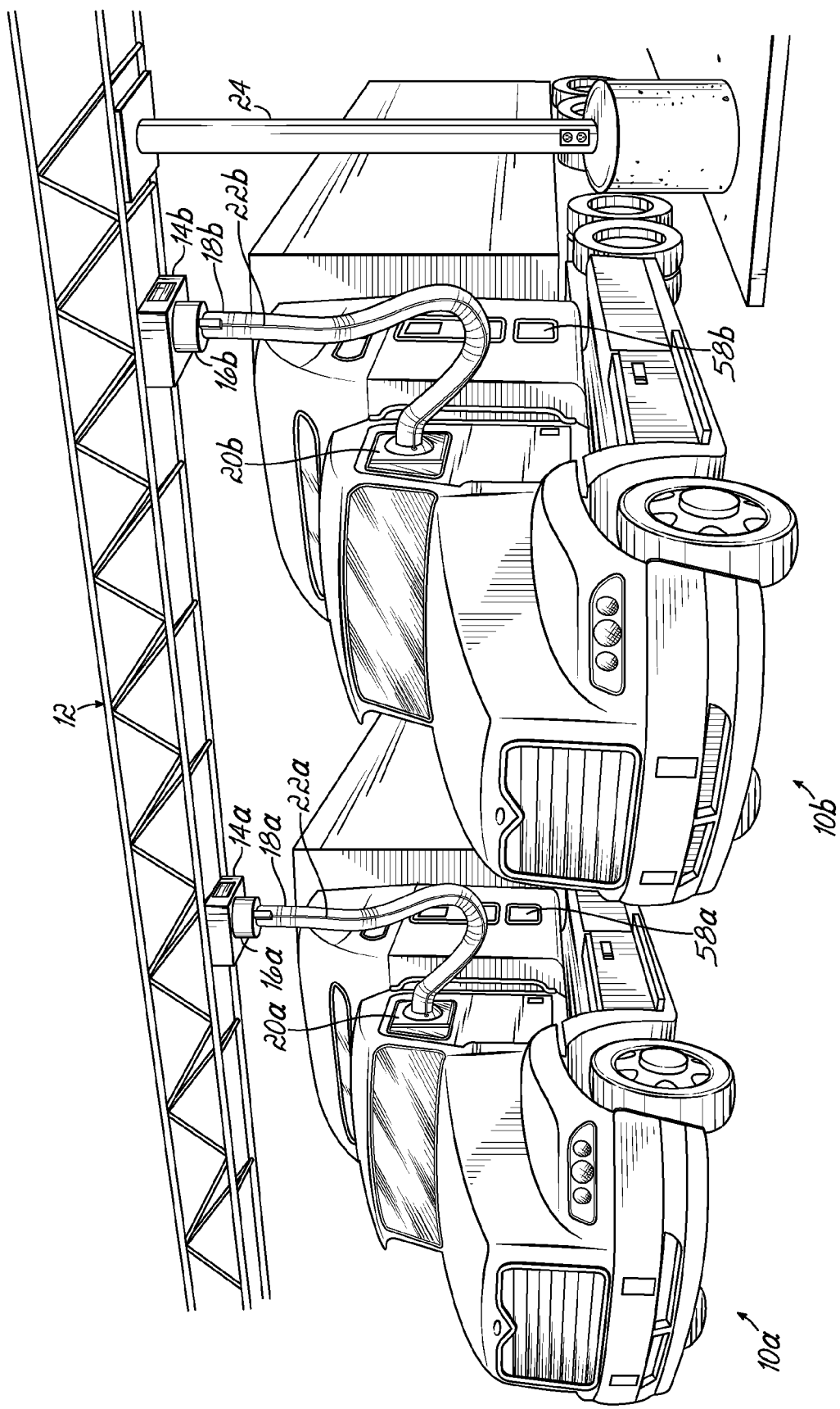
FIG. 1 is a perspective view of a truck parking lot with an overhead gantry, to which Service Modules are connected.

An exemplary apparatus to provide HVAC and other services to parked tractor trailers is shown in FIG. 1. As shown in FIG. 1, two vehicles, such as trucks 10a, 10b are parked under an overhead gantry 12. Multiple stationary housings 14a, 14b may be attached to the gantry 12. Descending from each stationary housing 14a, 14b is a strain relief 16a, 16b and a conduit 18a, 18b attached to a service module 20a, 20b, which may be positioned in a window of a stationary vehicle 10a, 10b and provides a substantially airtight seal for climate control. The conduit 18a, 18b is bendable to a selected elevation and oriented so as to accommodate vehicles 10a, 10b of various sizes. Also descending from the stationary housing 14a, 14b is a support cable 22a, 22b, which is attached to the service module 20a, 20b.

The gantry 21 is supported on one end by post 24. Those skilled in the art will recognize that the overhead means for supporting the stationary housing 14a, 14b can vary without departing from the spirit and scope of the present invention. For example, the horizontal gantry 12 could be a roof or roof truss, and the post 24 could be replaced by a building, wall, or other structure capable of supporting the gantry 12.

Figure 2:
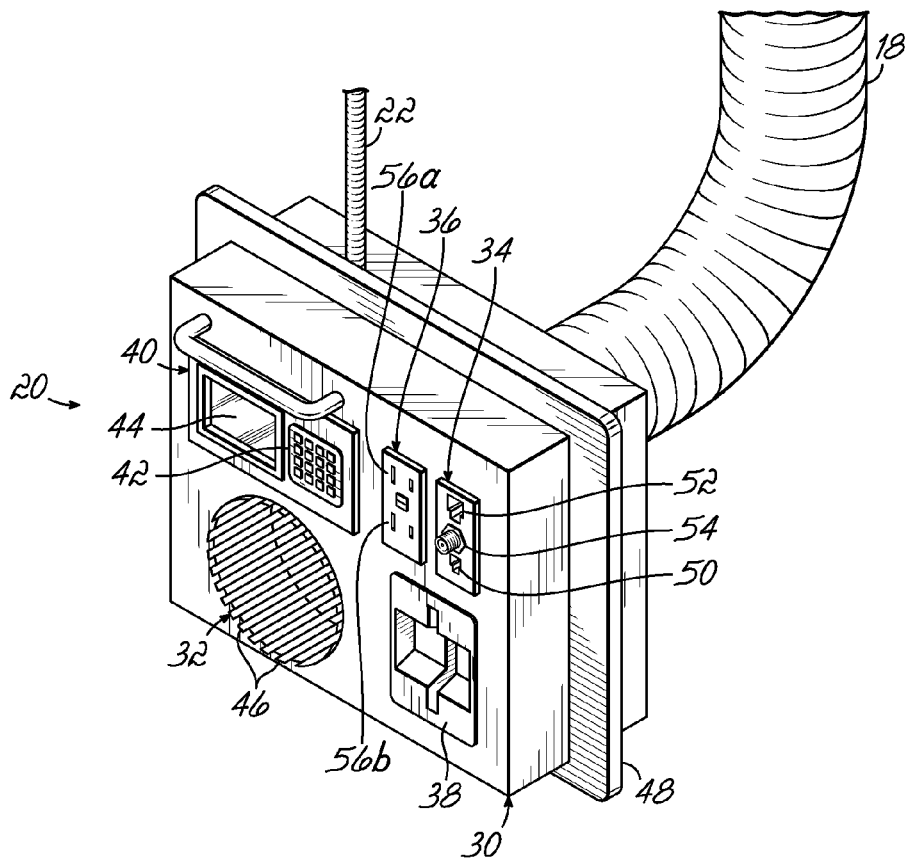
FIG. 2 is a perspective view of an exemplary Service Module of the units in FIG. 1.

As shown in FIG. 2, the service module 20 provides various services available from the supply panel 30 portion of the service module 20 that extends into the vehicle 10a or 10b. The illustrated embodiment shows a conditioned air discharge vent 32, a communications services sub-panel 34, an electrical outlet sub-panel 36, a card reader 38, and a keypad 42 and display 44 forming an operator interface sub-panel 40. The keypad 42 may be an array of switches, which can be actuated to produce a desired result, or in other embodiments may be similar to a qwerty key board. Some embodiments of the conditioned air discharge vent 32 may contain louvers 46 that can be rotated to direct air flow in various directions as it enters the vehicle 10a or 10b. A return air vent (not shown) may be located on the bottom of the supply panel 30, adjacent to the template 48.

The communications services sub-panel 34 may contain a telephone jack receptacle 50, a network jack receptacle 52, and a connector 54 for television, video, and/or radio signals. The electrical outlet sub-panel 36 may contain a pair of conventional, nominal 120 VAC power receptacles 56a, 56b. The card reader 38 may be a conventional card reader that the vehicle operator can use to pay for the services provided by the service module 20. The display 44 permits the vehicle operator to interact with the system controlling the supply panel 30 and controlling the convenience services provided to the service module 20. The display 44 may additionally provide information to the vehicle operator. This information may be in the form of indicating lights, an alphanumeric display, and/or a printer. The information provided by some embodiments may include supply panel status and condition, environmental conditions in the vehicle interior and/or exterior, a printed receipt, and instructions to the vehicle operator to perform tasks, such as to turn off the vehicle's engine if an engine idle is detected. Those skilled in the art will recognize that any combination of the above services, along with other services not mentioned, could be used without departing from the spirit and scope of the present invention. For example, the supply panel 30 might additionally include multiple telephone jack receptacles 50 to allow simultaneous voice and data communications and a 220 volt electrical outlet, in addition to the services described above.

A support cable 22 permits the weight of the service module 20 to be carried by the stationary housing 14. The support cable 22 may be a separate cable as shown in the embodiment in FIG. 2, or support cable 22 may be coupled with conduit 18 as shown in the embodiment in FIG. 1. As shown in FIG. 2 the supply panel 30 is attached to a template 48, which may be sized, in some embodiments, to fit into a window opening of vehicle 10a or 10b and provide for a substantially airtight seal for climate control. In other embodiments, the template 48 may be sized and configured for installation through a service door 58a, 58b in the body of the sleeper portion of the vehicle 10a or 10b as best seen in FIG. 1. To effectuate a substantially airtight seal, a gasket, typically made of rubber, may be attached to the face of the template 48.

Once inserted into the service door opening 58a, 58b, a locking mechanism may be engaged to secure the service module 20. The locking mechanism, in some embodiments, may be a plurality of locking clips which may be extended from the supply panel 30 to engage the inner surface of the vehicle 10a or 10b. Those skilled in the art will recognize that various methods for securing the service module 20 within the service door opening 58a, 58b can be used without departing from the spirit and scope of the present invention.

Another embodiment containing an alternate configuration of the service module 20 may be of the type disclosed in U.S. Pat. No. 6,705,938 entitled "Apparatus for Controlling the Environment of a Parked Vehicle." Either of these configurations may be operable to interact with a unit capable of detecting an idling engine. Several options are available for detecting an idling engine. Some of these options include manual verification, infrared/thermal, sound, and vibration.

The vibration of an idling engine may be detected by monitoring frequency and magnitude of a measured acceleration. A vibration detection unit 60, such as the unit shown in FIG. 3, which may be incorporated in the service module 20 or may be separate from the service module 20 contains accelerometers, which are configured to measure both static and dynamic acceleration in two axes.

Figure 3:
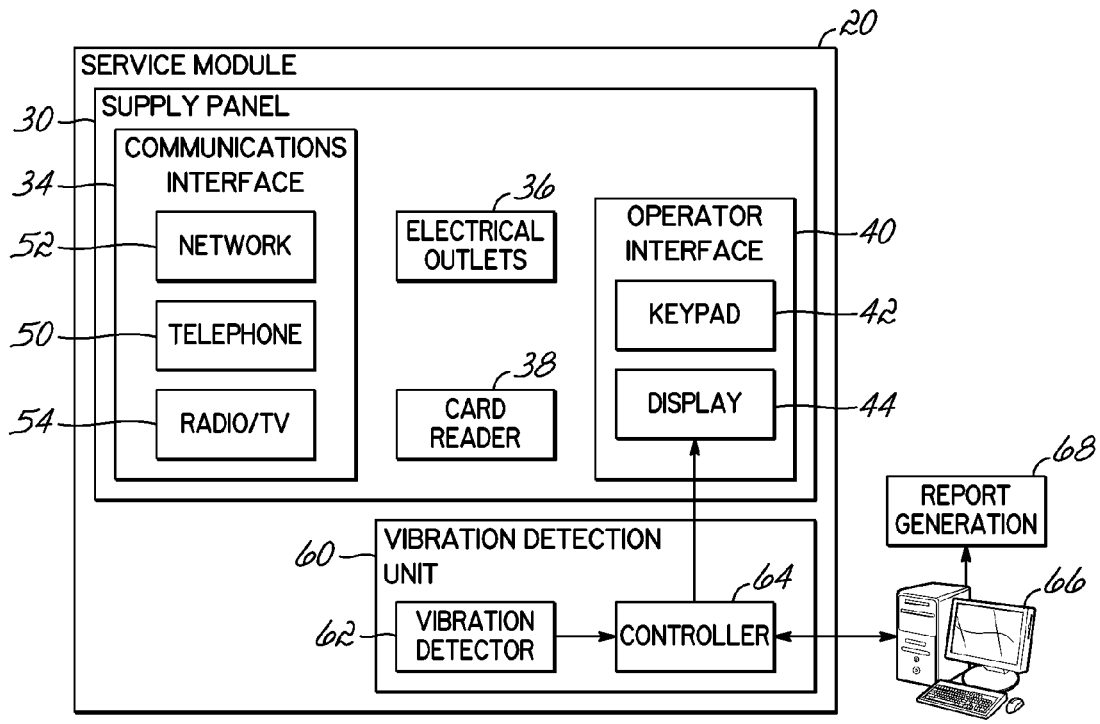
FIG. 3 is a block diagram of the Service Module of FIG. 2.

In the embodiment shown in FIG. 3, the service module 20 includes a vibration detection unit 60, which measures both static and dynamic acceleration as described above on a parked vehicle 10a or 10b for use in the determination of the engine's idle status. A general definition of an Engine Idle Signature or EIS was developed through empirical studies of various make, year, and model of Class VI-VIII, heavy duty vehicles at all expected average idling RPM ranges. This signature was recorded as a function of frequency and acceleration to develop a simple empirical model for the EIS as can be seen in the graph 100 in FIG. 4. Some embodiments may use this simple model to determine if the engine is idling. However, other sources of vibration also may be detected and need to be differentiated from EIS vibration indicated by region 102 on graph 100. Other sources of vibration may occur from transport refrigeration units (TRU) 104 and/or auxiliary power units (APU) 106, as well as movement within the vehicle 10a by the operator and vibrations caused by neighboring vehicles 10b, which may be idling within close proximity. In other embodiments, a further analysis of the vibrations may assist in the identification of the unique and different vibration signatures 102-106 produced by TRUs and APUs, as well as EIS. Identification of TRUs and APUs may also allow for the offering of additional services to those vehicles having electric stand-by options.

Figure 4:
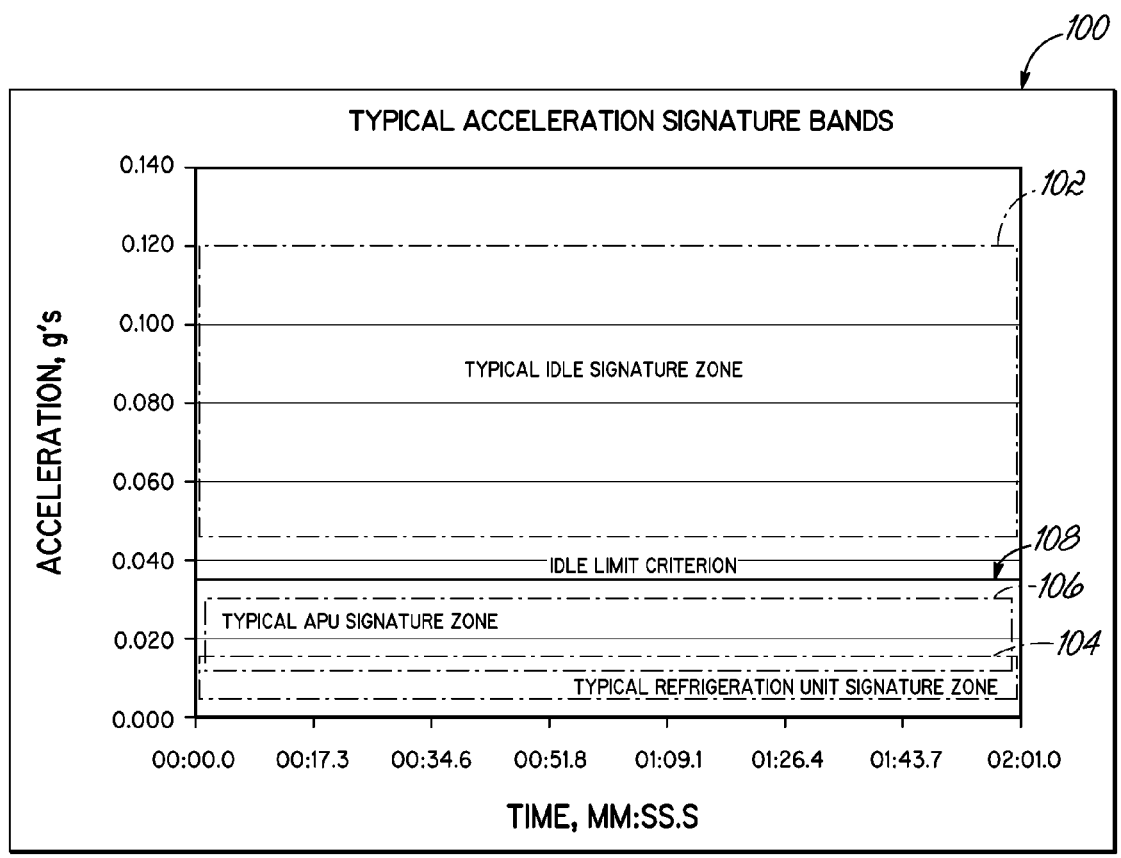
FIG. 4 is a graph showing the Acceleration Signature Bands representing an empirical model of idle signatures used by the Service Module in FIGS. 2 and 3.

The empirical model in FIG. 4 developed for EIS accounts for variations in tire pressures as well as variations in parking lot surfaces. Vibration is detected by the vibration detector 62 by measuring static and dynamic acceleration. The vibration detector 62 may utilize MEMS accelerometers such as with vibration detectors manufactured by Signal Quest of Lebanon, N.H. In these embodiments the vibration detector 62 may also communicate with the controller 64 through an RS232 connection. These vibrations are then processed by the empirical model to produce an Engine On or Engine Off output signal. It was found that EIS signals fell into a range of about 0.045 g to about 0.120 g, where other vibration sources tended to be below about 0.030 g.

Figure 5:
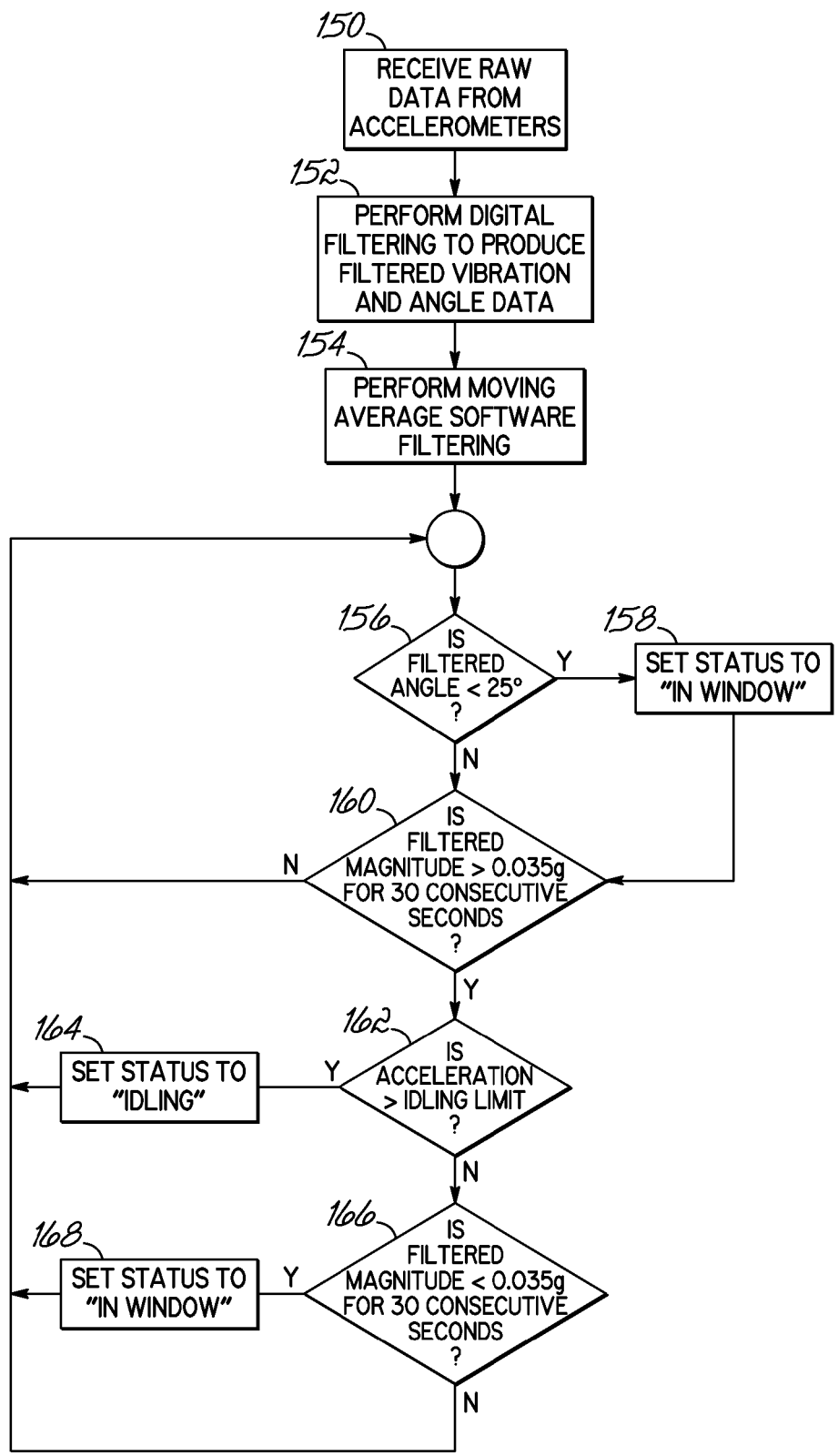
FIG. 5 is a flowchart showing an exemplary process for engine idle detection used by the controller in FIG. 3 and using the empirical model in FIG. 4.

An exemplary algorithm used to differentiate the vibrations consistent with embodiments of the invention is shown in the flowchart in FIG. 5. Raw acceleration data is received from the vibration detection unit 60 in block 150. The acceleration data is first passed through a digital low pass filter for initial filtering of the vibration data and angle data from the service module 20 identifying the orientation of the service module in block 152. The vibration data is then further filtered using a moving average filter in block 154. Moving average filters are popular filters for common tasks such as reducing random noise while retaining a sharp step response.

After the acceleration data has been filtered, a check is made on the filtered angle to determine if the relative angular position of the service module is less than about 25°. The reference angle is 0° (ideally) when in the service module is attached to a cab, and 90° (ideally) when hanging in "inactive" position. If the angle is less than about 25°, indicating the service module as attached to the cab, ("Yes" branch of decision block 156), then a status of the Service Module 20 may be set to "In Window" in block 158. The algorithm then continues to block 160. If, however the angle is greater than about 25° ("No" branch of decision block 156), then the algorithm continues in block 160 where the magnitude of the filtered vibration is checked.

Using the empirical model shown in FIG. 4, an idle limit criterion 108 may be selected that separates the typical engine idle signature zone 102 from the idle signatures of TRUs 104 and APUs 106. In the embodiment of the empirical model illustrated in FIG. 4, an idle limit of approximately 0.035 g is selected. The filtered magnitude of the vibration is then compared to the idle limit. If the magnitude is greater than the idle limit for an established time period, for example approx. 30 seconds, ("Yes" branch of decision block 160), then the algorithm continues in block 162. Otherwise ("No" branch of decision block 160), the algorithm continues to check the filtered vibration and angle data at block 156.

The acceleration of the vibration is then checked in block 162 to determine if the acceleration is greater than the idling limit. If the acceleration is greater than the idling limit ("Yes" branch of decision block 162), then the status of the Service Module 20 may be set to "Idling" in block 164, which would trigger other actions as described in more detail below. If the acceleration is less than the idling limit ("No" branch of decision block 162), then the magnitude of the vibration is again checked in block 166. If the magnitude of the vibration is less than the idle limit for 30 consecutive seconds ("Yes" branch of decision block 166), then the status of the Service Module 20 may be set to "In Window" in block 168 and the algorithm continues to check the filtered vibration and angle data at block 156. Otherwise ("No" branch of decision block 166), the algorithm simply continues at block 156 as above.

Additionally, as discussed above, vehicle operators may occasionally park and put a service module (SM) into the window adapter, but not turn on any of the services. As such, the vibration detection unit 60 may also be configured to detect vertical position (orientation) of the service module 20 as well as identifying when a vehicle operator is idling the main engine.

The vibration detector 62 transmits the vibration data to a controller 64, which performs the signal analysis of the empirical model to determine if an EIS is detected, indicating that the engine is idling. The controller may additionally, in some embodiments, send data to customer service 66 which then may generate an accurate report 68 of whether vehicles 10a, 10b, while using the services are continuing to idle their engines. This report 68 may then be sent to fleets, which have decided to lessen the idling that occurs while using the service.

The controller 64, based on the event logic, may also deliver a message to the display 44 of the operator interface 40 on the supply panel 30 in order to notify an offending operator that he is idling and that services will shut down if the practice continues. Notices may additionally be sent to the operator in the form of phone calls or personal visits by customer service employees requesting that they shut their engine off. If idling continues, the controller 64 may further be configured to discontinue the service to the offending driver.

Figure 6:
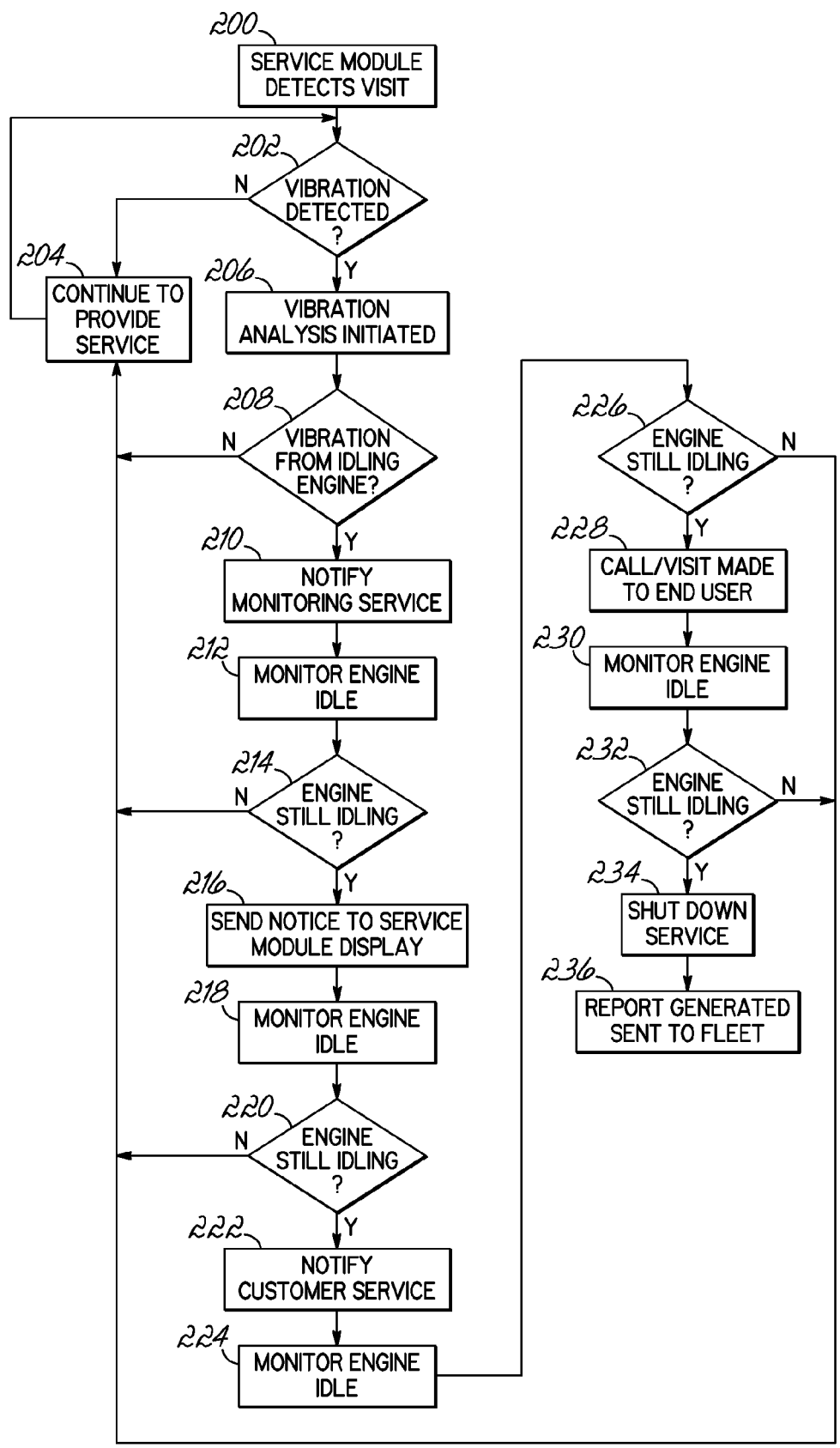
FIG. 6 is a flowchart showing an exemplary process for determining EIS from vibrations measured by the Service Module in FIGS. 2 and 3.

FIG. 6 is a flowchart of a process that one embodiment of the controller 64 may use for vibration detection. Initially the service module 20 detects a visit in block 200. This may be triggered by an operator inserting a card in the card reader to start the service, or a signal by the accelerometers in the vibration detection unit indicating a change in orientation of the service module 20 when it is couple to the vehicle 10a or 10b, using, for example, the algorithm in FIG. 5 above. If no vibration is detected by the vibration detector ("No" branch of decision block 202), then the service module 20 continues to provide services to the operator of the vehicle in block 204. If, however, a vibration is detected ("Yes" branch of decision block 202), then the controller may perform a vibration analysis in block 206, using, for example, the empirical model discussed above.

After the analysis, the controller determines if the vibration is caused by an idling engine. If not ("No" branch of decision block 208), then the service module 20 continues to provide services in block 204. If, however, the vibration is caused by an idling engine ("Yes" branch of decision block 208), then a notification of the idling engine is sent to a monitoring service in block 210, which may be customer service 66 as discussed above, or the monitoring service may be incorporated into the processor and performed locally, only notifying customer service 66 when determined necessary. The controller then continues to monitor the engine idle in block 212 for a predetermined period of time.

If the operator turns off the vehicle's engine before the predetermined period of time elapses ("No" branch of decision block 214), then the service module 20 continues to provide services to the operator in block 204. If the operator continues to let the engine idle ("Yes" branch of decision block 214), then the controller 64 may send a notice to the display 44 on the service module 20, instructing the operator, for example, to turn off the vehicle's engine in block 216. The controller then continues to monitor the engine idle in block 218 for another predetermined period of time.

If the operator turns off the vehicle's engine before the predetermined period of time elapses ("No" branch of decision block 220), then the service module 20 continues to provide services to the operator in block 204. If the operator continues to let the engine idle ("Yes" branch of decision block 220), then the controller 64 may notify customer service 66 in block 222, which may record the information for reports sent to fleets that use the service. The controller then continues to monitor the engine idle in block 224 for an additional predetermined period of time.

If the operator turns off the vehicle's engine before the predetermined period of time elapses ("No" branch of decision block 226), then the service module 20 continues to provide services to the operator in block 204. If the operator, however, continues to let the engine idle ("Yes" branch of decision block 226), then the controller 64 may again notify customer service 66 and a customer service representative may then either physically visit the vehicle operator, or may call the vehicle operator using the phone jack 50 on the service module 20 in block 228 asking the driver to turn off the vehicle. The controller then continues to monitor the engine idle in block 230 for a final predetermined period of time.

If the operator turns off the vehicle's engine before the final predetermined period of time elapses ("No" branch of decision block 232), then the service module 20 continues to provide services to the operator in block 204. If the operator, however, continues to let the engine idle ("Yes" branch of decision block 232), then the controller 64 may be configured to instruct the service module 20 to discontinue the service in block 234. The controller may then forward this information to customer service 66 for reports to be generated and sent to the fleet in block 236.

While the vibration detection unit, in some embodiments, is implemented in the Service Module 20, other embodiments may implement the vibration detection unit differently. For example, the vibration detector 62 may be incorporated in the service module 20, but the controller 64 may be external to the service module, potentially a central processing controller that is responsible for controlling several service modules 20. The vibration detection unit may also be a separate module that may be separately mounted to the vehicle, which must also be activated prior to the service module 20 being able to provide services to the vehicle operator.

While all of the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A service unit for providing a convenience service to a cab of a tractor trailer, comprising:
   a supply panel operable to selectively attach to a cab of a tractor trailer, said supply panel providing conditioned air to said cab; and
   a controller in electrical communication with a vibration detector and the supply panel, the controller configured to receive vibration signals relating to the tractor trailer from the vibration detector and identify an idling engine of the tractor trailer based on the received vibration signals, wherein the controller causes the supply panel to take an action based on the identification of the idling engine; wherein the vibration detector is incorporated into the service unit.

2. The service unit of claim 1 wherein the supply panel is further operable to provide at least one convenience service selected from the group consisting of radio signals, electrical power, telephone, computer network, and video.

3. The service unit of claim 1 wherein the controller is further operable to activate said service unit.

4. The service unit of claim 1 wherein the supply panel comprises a display and wherein the controller is operable to send a message to the display.

5. The service unit of claim 1 wherein the vibration detector and the controller communicate using an RS232 protocol.

6. The service unit of claim 1 wherein the service unit is operable to:
   transmit the vibration signals from the vibration detector to the controller;
   perform a signal analysis by the controller on the vibration signals to identify an engine idle signature; and
   in response to identifying an engine idle signature, store a duration of the engine idle signature.

7. The service unit of claim 1, further comprising:
   a service module that houses the supply panel and is operable to fit into a window opening of the tractor trailer, wherein at least one of the vibration detector or controller is incorporated into the service module.

8. The service unit of claim 1, wherein the controller is operable to discontinue services provided by the supply panel in response to detecting a period of continued engine idling.

9. The service unit of claim 1, wherein the controller is operable to determine if the supply panel is coupled to the tractor trailer.

10. The service unit of claim 9, wherein the controller is operable to determine if the supply panel is coupled to the tractor trailer based on angle data filtered from the vibration signals received from the vibration detector.

11. The service unit of claim 1, wherein the controller is further operable to differentiate between vibration signals relating to an idling engine of the tractor trailer and vibration signals relating to other sources.

12. The service unit of claim 11, wherein the other sources comprise at least one of a transport refrigeration unit, an auxiliary power unit, movement within the tractor trailer, or a neighboring vehicle.

13. The service unit of claim 1, wherein the action taken by the supply panel that is caused by the controller comprises that the supply panel:
   display a notice on a display of the supply panel; and
   if the identification of the idling engine continues after the notice is displayed, shut down service from the supply panel.

* * * * *